US012748336B2

(12) United States Patent
Ko et al.

(10) Patent No.: US 12,748,336 B2
(45) Date of Patent: Sep. 29, 2026

(54) FRONT LIGHT MODULE AND ELECTROPHORETIC DISPLAY DEVICE

(71) Applicant: E Ink Holdings Inc., Hsinchu (TW)

(72) Inventors: Chih Cheng Ko, Hsinchu (TW); Yun-Nan Hsieh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 306 days.

(21) Appl. No.: 18/391,551

(22) Filed: Dec. 20, 2023

(65) Prior Publication Data

US 2024/0280875 A1 Aug. 22, 2024

(30) Foreign Application Priority Data

Feb. 16, 2023 (TW) ................................ 112105502
Sep. 6, 2023 (TW) ................................ 112133761

(51) Int. Cl.
*G02F 1/1677* (2019.01)
*F21V 8/00* (2006.01)
*G02F 1/167* (2019.01)
*G06F 3/041* (2006.01)

(52) U.S. Cl.
CPC ......... *G02F 1/1677* (2019.01); *G02B 6/0088* (2013.01); *G02B 6/0093* (2013.01); *G02F 1/167* (2013.01); *G06F 3/0412* (2013.01)

(58) Field of Classification Search
USPC ............................................ 349/63; 359/296
See application file for complete search history.

(56) References Cited

U.S. PATENT DOCUMENTS 10,698,509 B2 6/2020 Zeng
11,372,491 B2 6/2022 Li et al.
11,402,550 B2 8/2022 Li et al.
11,493,382 B1 11/2022 Almanza-Workman et al.
2015/0077654 A1 3/2015 Chu et al.
2015/0226906 A1* 8/2015 Hsieh .................... G02F 1/1336 359/296
2021/0278877 A1* 9/2021 Hsieh .................... G02F 1/1677
2021/0396912 A1 12/2021 Yan et al.

FOREIGN PATENT DOCUMENTS

TW I514062 12/2015
TW I533040 5/2016

OTHER PUBLICATIONS

"Office Action of Taiwan Counterpart Application", issued on Aug. 13, 2024, p. 1-p. 7.

* cited by examiner

*Primary Examiner* — Dung T Nguyen
(74) *Attorney, Agent, or Firm* — JCIPRNET

(57) ABSTRACT

A front light module including a light guide plate, a light source, a protective cover plate, an appearance color layer, and a functional layer is provided. The light guide plate has a first surface, a second surface opposite to the first surface, and a light incident surface connecting the first surface to the second surface. The light source is disposed beside the light incident surface and configured to emit light toward the light incident surface. The protective cover plate is disposed on the first surface, and the protective cover plate has a third surface facing away from the light guide plate and a fourth surface facing the light guide plate. The appearance color layer is disposed on a portion of the third surface. The functional layer covers the appearance color layer and the third surface. An electrophoretic display device is also provided.

22 Claims, 5 Drawing Sheets

FRONT LIGHT MODULE AND ELECTROPHORETIC DISPLAY DEVICE

CROSS-REFERENCE TO RELATED APPLICATION

This application claims the priority benefit of Taiwan application serial no. 112105502, filed on Feb. 16, 2023 and Taiwan application serial no. 112133761, filed on Sep. 6, 2023. The entirety of each of the above-mentioned patent applications is hereby incorporated by reference herein and made a part of this specification.

BACKGROUND

Technical Field

The disclosure relates to a light source module and a display device; more particularly, the disclosure relates to a front light module and an electrophoretic display device.

Description of Related Art

A front light module may be applied to a reflective display device (e.g., an electrophoretic display device) to illuminate a reflective display panel. Thereby, even in an environment illuminated by light with low brightness, a user is able to use the reflective display device as usual.

Generally, the front light module includes a light source, a light guide plate, and a protective cover plate. The light guide plate may guide illumination light emitted by the light source to the reflective display panel (e.g., the electrophoretic display panel) located below the front light module. The reflective display panel reflects the illumination light to generate image light, and then the image light passes through the light guide plate and the protective cover plate and is transmitted to eyes of the user, so that the user is allowed to watch images displayed on the electrophoretic display panel.

For aesthetic purposes, a peripheral region of the protective cover plate is often coated with an ink layer to cover the underlying elements, while a display region of the protective cover plate is not coated with any ink. In general, the ink is coated onto a lower surface of the protective cover plate, i.e., the surface of the protective cover plate facing the light guide plate, and then the protective cover plate may be adhered to the light guide plate through an optical adhesive layer. However, with such a design, since the protective cover plate has a certain thickness, after a portion of light coming from the light guide plate obliquely enters an upper surface of the protective cover plate, the light moves away from the display region by a short distance in a horizontal direction. After that, the oblique light is reflected or totally reflected by the upper surface of the protective cover plate to the ink layer on the lower surface of the protective cover plate. At this time, the ink layer reflects the light to the upper surface of the protective cover plate, and the light passes through the upper surface and is transmitted to the eyes of the user, which leads to the phenomenon of halation around the display region. The halation becomes especially problematic when a non-black ink is applied.

SUMMARY

The disclosure provides a front light module capable of effectively suppressing halation.

The disclosure provides an electrophoretic display device capable of effectively suppressing halation around a display region.

According to an embodiment of the disclosure, a front light module that includes a light guide plate, a light source, a protective cover plate, an appearance color layer, and a functional layer is provided. The light guide plate has a first surface, a second surface opposite to the first surface, and a light incident surface connecting the first surface to the second surface. The light source is disposed beside the light incident surface and configured to emit light toward the light incident surface. The protective cover plate is disposed on the first surface, and the protective cover plate has a third surface facing away from the light guide plate and a fourth surface facing the light guide plate. The appearance color layer is disposed on a portion of the third surface. The functional layer covers the appearance color layer and the third surface.

According to an embodiment of the disclosure, an electrophoretic display device that includes the front light module and an electrophoretic display panel is provided. The electrophoretic display panel is disposed below the front light module, and the light guide plate is located between the electrophoretic display panel and the protective cover plate.

In view of the above, in the front light module and the electrophoretic display device provided in one or more embodiments of the disclosure, the appearance color layer is disposed on the third surface of the protective cover plate facing away from the light guide plate, and the functional layer covers the appearance color layer. Since the appearance color layer is disposed on an upper surface of the protective cover plate, halation resulting from the reflection by the appearance color layer may be effectively suppressed.

In order to make the above-mentioned features and advantages of the disclosure comprehensible, embodiments accompanied with drawings are described in detail below.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DESCRIPTION OF THE EMBODIMENTS

Figure 1A:
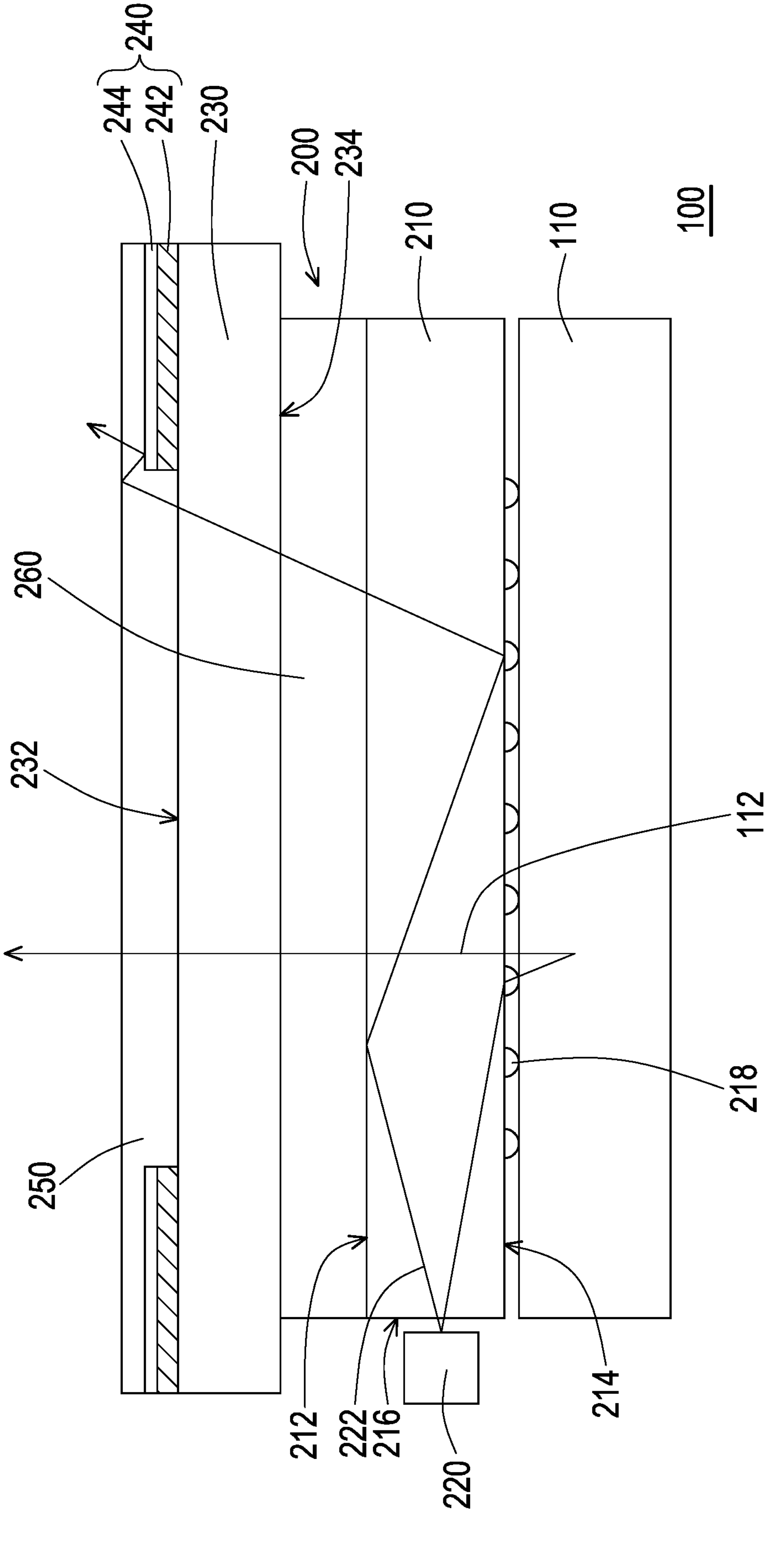
FIG. 1A is a schematic cross-sectional view of an electrophoretic display device according to an embodiment of the disclosure.

Reference will now be made in detail to the exemplary embodiments of the disclosure, and examples of the exemplary embodiments are illustrated in the accompanying drawings. Whenever possible, the same reference numbers marking the corresponding elements/components/steps are used in the drawings and descriptions to indicate the same or similar parts.

Figure 1B:
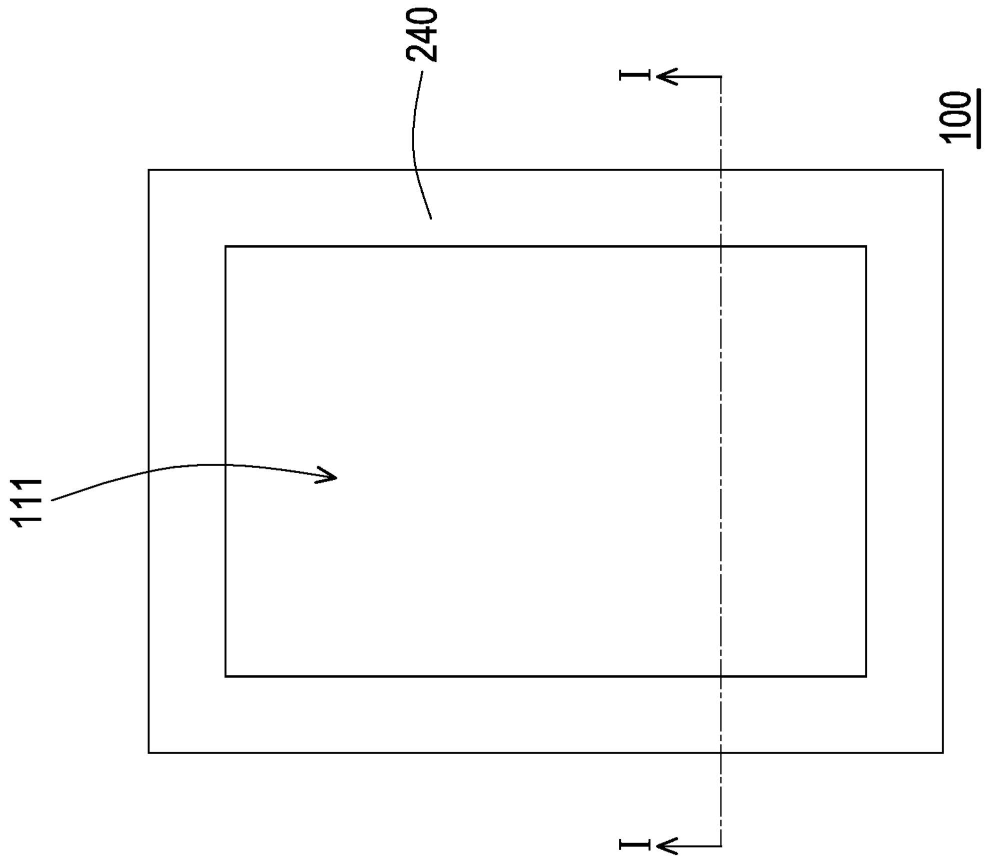
FIG. 1B is a schematic front view of the electrophoretic display device depicted in FIG. 1A.

FIG. 1A is a schematic cross-sectional view of an electrophoretic display device according to an embodiment of the disclosure. FIG. 1B is a schematic front view of the electrophoretic display device depicted in FIG. 1A. Here, FIG. 1A is a schematic cross-sectional view taken along an I-I line depicted in FIG. 1B. With reference to FIG. 1A and FIG. 1*i*, an electrophoretic display device 100 provided in this embodiment includes a front light module 200 and an electrophoretic display panel 110, and the electrophoretic display panel 110 is disposed below the front light module 200. The front light module 200 includes a light guide plate 210, a light source 220, a protective cover plate 230, an appearance color layer 240, and a functional layer 250. The light guide plate 210 has a first surface 212, a second surface 214 opposite to the first surface 212, and a light incident surface 216 connecting the first surface 212 to the second surface 214. The light source 220 is disposed beside the light incident surface 216 and configured to emit light toward the light incident surface 216. In this embodiment, the light source 220 is, for instance, a light emitting diode (LED), a cold cathode fluorescent lamp (CCFL), or another appropriate light emitting element. An illumination light beam 222 emitted by the light source 220 enters the light guide plate 210 from the light incident surface 216 and is totally reflected by the first surface 212 and the second surface 214, so that the illumination light beam 222 is transmitted in the light guide plate 210. In addition, an optical microstructure 218 is disposed on at least one of the first surface 212 and the second surface 214 (in FIG. 1A, the optical microstructure 218 is exemplarily disposed on the second surface 214). When the Illumination light beam 222 irradiates the optical microstructure 218, the optical microstructure 218 destroys the above-mentioned total reflection, so that one portion of the Illumination light beam 222 is scattered downward to the electrophoretic display panel 110, while the other portion of the Illumination light beam 222 is scattered upward and leaves the light guide plate 210. The electrophoretic display panel 110 has a pixel structure that may form different reflective patterns; therefore, the electrophoretic display panel 110 reflects and converts the illumination light beam 222 scattered in a downward manner to an image beam 112, and then the image beam 112 sequentially passes through the light guide plate 210 and the protective cover plate 230 and is transmitted to eyes of a user. As such, even if the brightness of the ambient light is insufficient, the user is able to watch images displayed on the electrophoretic display panel 110.

In this embodiment, the light guide plate 210 is located between the electrophoretic display panel 110 and the protective cover plate 250. The protective cover plate 230 is disposed on the first surface 212, and the protective cover plate 230 has a third surface 232 facing away from the light guide plate 210 and a fourth surface 234 facing the light guide plate 210. The appearance color layer 240 is disposed on one portion of the third surface 232. The functional layer 250 covers the appearance color layer 240 and the third surface 232. According to this embodiment, the appearance color layer 240 is, for instance, an ink layer, which may be formed by performing an ink printing process on one portion of the third surface 232. In one embodiment, the appearance color layer 240 is directly formed on the third surface 232 through ink printing. In other embodiments, the ink layer may also be formed on one portion of the third surface 232 through printing or transfer printing.

According to this embodiment, the appearance color layer 240 is disposed in a peripheral region of the third surface 232; that is, the appearance color layer 240 serves as and achieves effects of side frames shown in FIG. 1B. The appearance color layer 240 covers the light source 220, and the appearance color layer 240 exposes a display region 111 of the electrophoretic display panel 110. According to this embodiment, the appearance color layer 240 includes a plurality of stacked sub-ink layers. For instance, the sub-ink layers include a non-black sub-ink layer 244 and a black sub-ink layer 242, where the black sub-ink layer 242 is disposed between the protective cover plate 230 and the non-black sub-ink layer 244. The non-black sub-ink layer 244 is, for instance, a white sub-ink layer or a sub-ink layer of another color, which determines the appearance color of the side frames as a white color or another color. In addition, the black sub-ink layer 242 disposed below the non-black sub-ink layer 244 may absorb stray light, so as to prevent the stray light from escaping from the side frames. According to another embodiment, the appearance color layer 240 may also be a single ink layer.

In this embodiment, the functional layer 250 is an anti-glare layer. However, in other embodiments, the functional layer 250 may also be an anti-fingerprint layer, an anti-reflection layer, or a hard coating layer. The functional layer 250 may be formed on the appearance color layer 240 and the third surface 232 through ultraviolet (UV) imprinting. However, in other embodiments, the functional layer 250 may also be formed on the appearance color layer 240 and the third surface 232 through coating, spray coating, and so on. Additionally, the functional layer 250 may be formed by performing one single manufacturing process or multiple manufacturing processes.

According to this embodiment, the protective cover plate 230 is a transparent substrate, and a material of the protective cover plate 230 includes, for instance, plastic or glass. Besides, in an embodiment, the front light module 200 further includes a touch panel 260 disposed between the light guide plate 210 and the protective cover plate 230, so that the electrophoretic display device 100 is able to perform a touch sensing function. However, in other embodiments, the front light module 200 may not include the touch panel 260, and the protective cover plate 230 is disposed on the light guide plate 210, whereby the resultant electrophoretic display device is not able to perform any touch sensing function. In another embodiment, the front light module 200 may not include the touch panel 260, and the protective cover plate 230 is disposed on the light guide plate 210, and the front light module 200 and the electrophoretic display panel 110 having a built-in touch sensing function together constitute an electrophoretic display device capable of performing the touch sensing function.

In the front light module 200 and the electrophoretic display device 100 provided in this embodiment, the appearance color layer 240 is disposed on the third surface 232 of the protective color plate 230 facing away from the light guide plate 210, and the functional layer 250 covers the appearance color layer 240. Since the appearance color layer 240 is disposed on an upper surface of the protective cover plate 230, when the illumination light beam 222 obliquely enters an inner edge of the appearance color layer 240 on the protective cover plate 230, the obliquely incident Illumination light beam 222 is transmitted in the functional layer 250 of a small thickness and is reflected by an upper surface of the functional layer 250 to the upper surface of the appearance color layer 240. At this time, even though the appearance color layer 240 reflects the illumination light beam 222 to the eyes of the user, due to the small thickness of the functional layer 250, the position where the illumination light beam 222 is reflected is rather close to the inner edge of the approach appearance color layer 240, and accordingly the user may barely sense any halation. By contrast, according to the conventional art, the ink layer is formed on the lower surface of the protective cover plate. Since the obliquely incident light passes through the protective cover plate of a great thickness, the position where the obliquely incident light is reflected is farther away from the inner edge of the ink layer. As such, halation becomes quite visible to the eyes of the user. Therefore, compared with the conventional art, the front light module 200 and the electrophoretic display device 100 provided in this embodiment may effectively suppress halation resulting from the reflection by the appearance color layer 240. In this embodiment, a thickness of the functional layer 250 is less than (e.g., far less than) a thickness of the protective cover plate 230.

Figure 2:
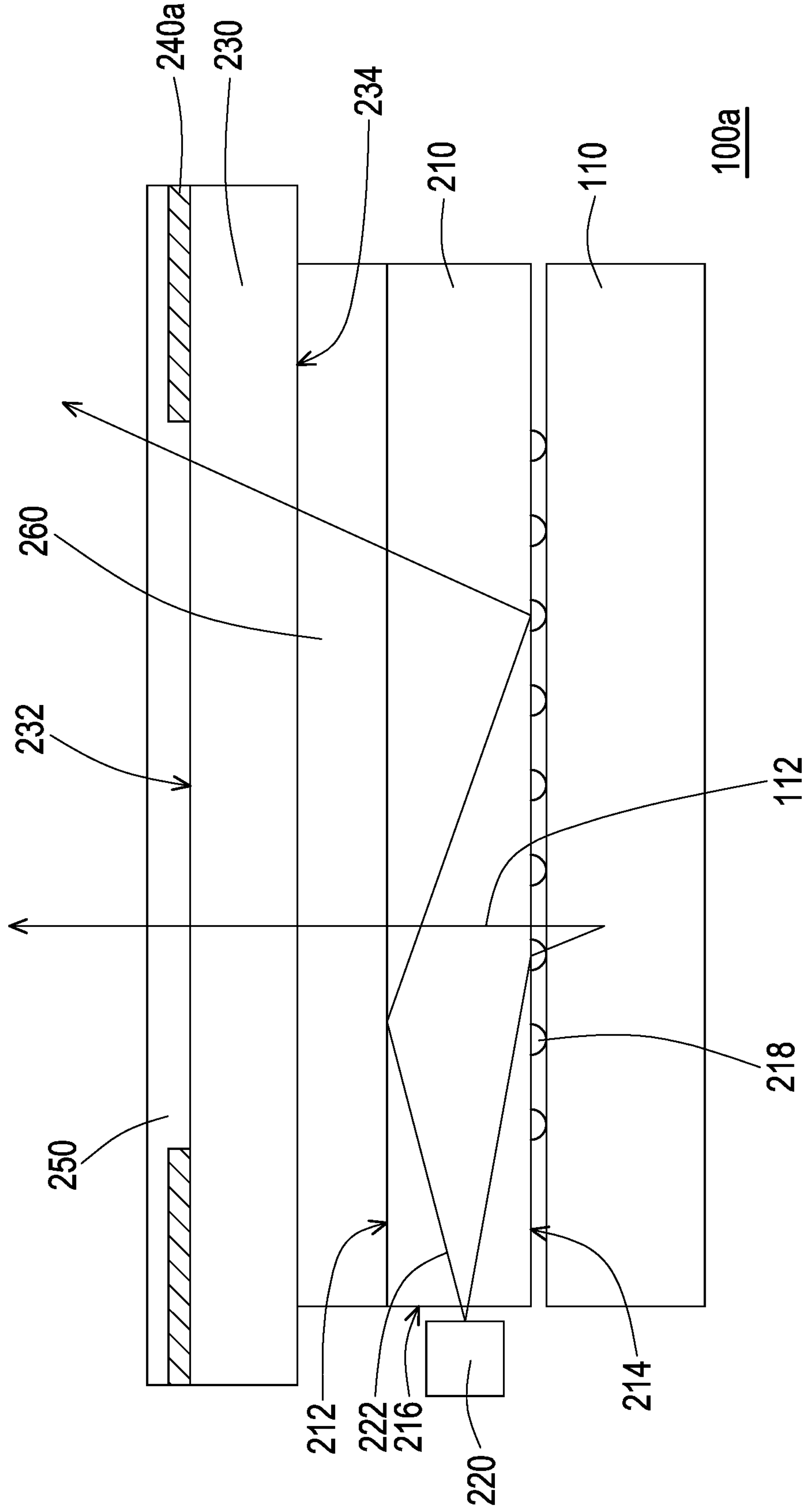
FIG. 2 is a schematic cross-sectional view of an electrophoretic display device according to another embodiment of the disclosure.

FIG. 2 is a schematic cross-sectional view of an electrophoretic display device according to another embodiment of the disclosure. With reference to FIG. 2, an electrophoretic display device 100*a* provided in this embodiment is similar to the electrophoretic display device 100 depicted in FIG. 1A, and the differences between the two are described below. In the electrophoretic display device 100*a* provided in this embodiment, the appearance color layer 240*a* is a monolayer film, such as a black ink layer, which is adapted to the case where black side frames are required.

Figure 3:
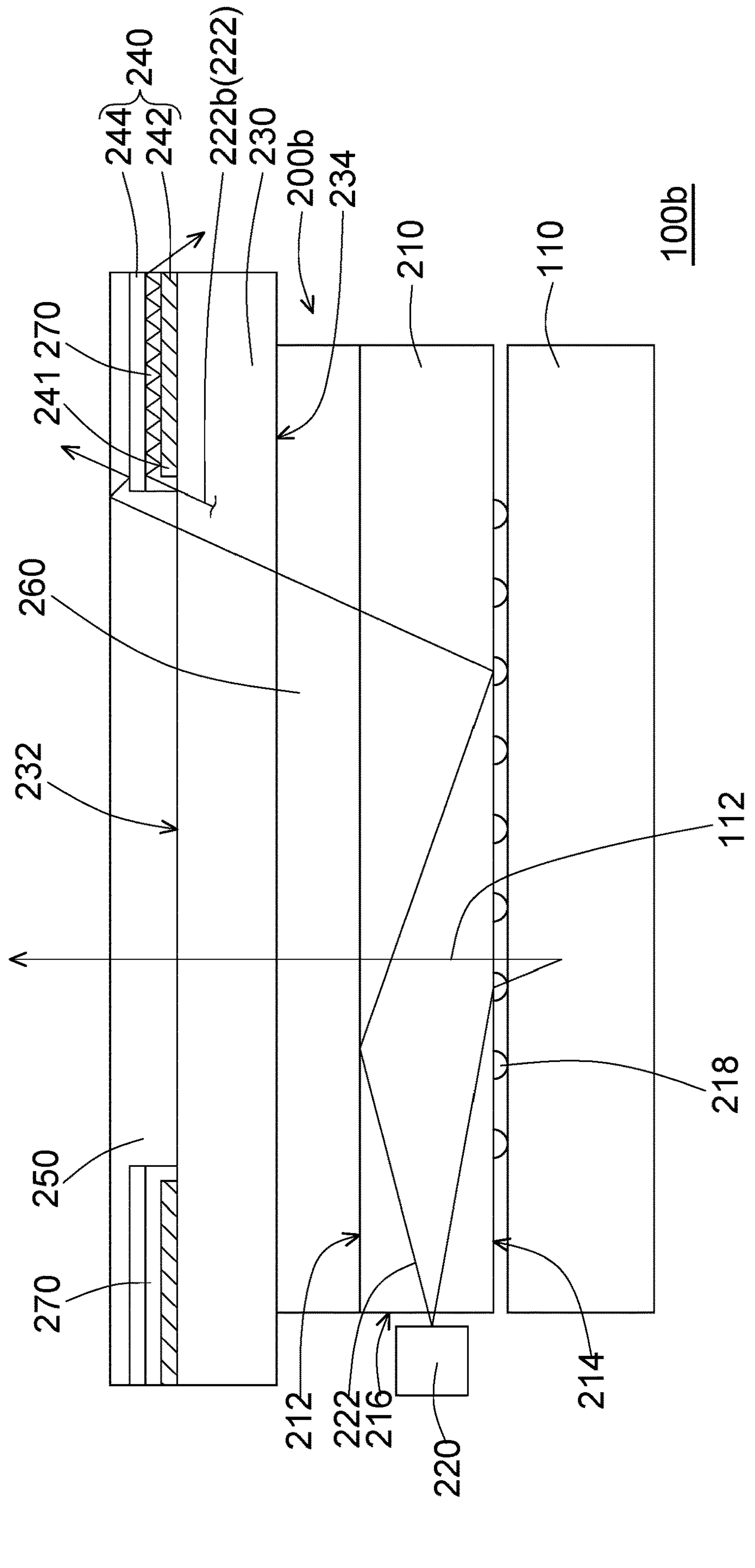
FIG. 3 is a schematic cross-sectional view of an electrophoretic display device according to yet another embodiment of the disclosure.

FIG. 3 is a schematic cross-sectional view of an electrophoretic display device according to yet another embodiment of the disclosure. With reference to FIG. 3, an electrophoretic display device 100*b* provided in this embodiment is similar to the electrophoretic display device 100 depicted in FIG. 1A, and the differences between the two are described below. In the electrophoretic display device 100*b* provided in this embodiment, a front light module 200*b* further includes a transparent layer 270 disposed between the non-black sub-ink layer 244 and the black sub-ink layer 242. In this embodiment, a refractive index of the transparent layer 270 is greater than a refractive index of the protective cover plate 230 and greater than a refractive index of the functional layer 250. Besides, in this embodiment, the transparent layer 270 encapsulates a side surface of an inner edge 241 of the black sub-ink layer 242.

In case that the front light module 200*b* is not equipped with the transparent layer 270, if there is an offset or imprecision in the ink printing positions of the non-black sub-ink layer 244 and the black sub-ink layer 242, it is easy for the user to observe bright lines at the imprecise ink printing positions when the illumination light beam 222 illuminates the inner edge of the non-black sub-ink layer 244. By contrast, in this embodiment, when the illumination light beam 222*b* illuminates a position near the inner edge of the non-black sub-ink layer 244, the illumination light beam 222*b* first passing through the transparent layer 270 with a relatively high refractive index continuously undergoes total internal reflection on the upper and lower surfaces of the transparent layer 270, remains confined within the transparent layer 270, and propagates within the transparent layer 270. Eventually, the illumination light beam 222*b* exits from a side surface of an outer edge of the transparent layer 270, away from the eyes of the user. As such, the transparent layer 270 effectively reduces the light transmission energy of the non-black sub-ink layer 244. Even if there is slight misalignment in the ink printing positions of the non-black sub-ink layer 244 and the black sub-ink layer 242, such a misalignment does not raise or is unlikely to raise the issue of bright lines visible to the user.

Figure 4:
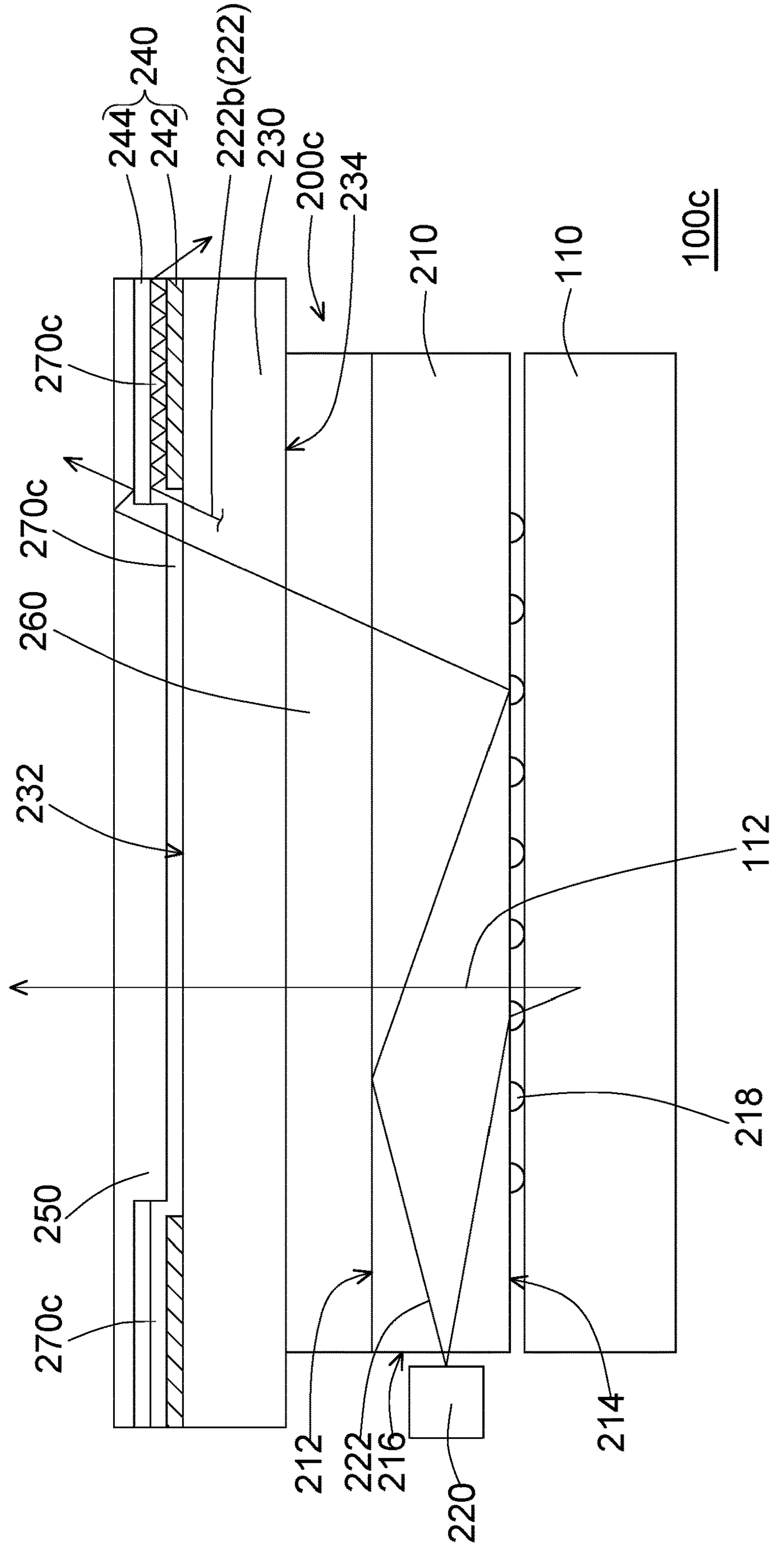
FIG. 4 is a schematic cross-sectional view of an electrophoretic display device according to still another embodiment of the disclosure.

FIG. 4 is a schematic cross-sectional view of an electrophoretic display device according to still another embodiment of the disclosure. With reference to FIG. 4, an electrophoretic display device 100*c* provided in this embodiment is similar to the electrophoretic display device 100*b* depicted in FIG. 3, and the differences between the two are described below. In a front light module 200*c* of the electrophoretic display device 100*c* provided in this embodiment, a transparent layer 270*c* covers the black sub-ink layer 242 and the other portion of the third surface 232 not covered by the appearance color layer 240. That is, the transparent layer 270*c* may be entirely disposed on the protective cover plate 230 and may be penetrated by the image beam 112 without affecting the display function of the electrophoretic display device 200*c*. The function of the transparent layer 270*c* is similar to the function of the transparent layer 270 depicted in FIG. 3, and the transparent layer 270*c* is also capable of allowing the illumination light beam 222*b* to exit from the side surface of the outer edge of the transparent layer 270*c*, so as to effectively reduce the light transmission energy of the non-black sub-ink layer 244 and further effectively resolve the above-mentioned issue of bright lines.

To sum up, in the front light module and the electrophoretic display device provided in one or more embodiments of the disclosure, the appearance color layer is disposed on the third surface of the protective cover plate facing away from the light guide plate, and the functional layer covers the appearance color layer. Since the appearance color layer is disposed on the upper surface of the protective cover plate, halation resulting from the reflection by the appearance color layer may be effectively suppressed.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A front light module, comprising:

a light guide plate, having a first surface, a second surface opposite to the first surface, and a light incident surface connecting the first surface to the second surface;

a light source, disposed beside the light incident surface and configured to emit light toward the light incident surface;

a protective cover plate, disposed on the first surface and having a third surface facing away from the light guide plate and a fourth surface facing the light guide plate;

an appearance color layer, disposed on one portion of the third surface, wherein the appearance color layer comprises a plurality of stacked sub-ink layers and a transparent layer disposed between the stacked sub-ink layers; and a functional layer, covering the appearance color layer and the third surface.

2. The front light module as claimed in claim 1, wherein the functional layer is an anti-glare layer, an anti-fingerprint layer, an anti-reflection layer, or a hard coating layer.

3. The front light module as claimed in claim 1, wherein the appearance color layer is disposed on a peripheral region of the third surface.

4. The front light module as claimed in claim 1, wherein the sub-ink layers comprise:

a non-black sub-ink layer; and a black sub-ink layer, disposed between the protective cover plate and the non-black sub-ink layer.

5. The front light module as claimed in claim 4, wherein the transparent layer is disposed between the non-black sub-ink layer and the black sub-ink layer.

6. The front light module as claimed in claim 5, wherein a refractive index of the transparent layer is greater than a refractive index of the protective cover plate and greater than a refractive index of the functional layer.

7. The front light module as claimed in claim 5, wherein the transparent layer encapsulates a side surface of an inner edge of the black sub-ink layer.

8. The front light module as claimed in claim 5, wherein the transparent layer covers the black sub-ink layer and the other portion of the third surface not covered by the appearance color layer.

9. The front light module as claimed in claim 1, wherein the protective cover plate is a transparent substrate.

10. The front light module as claimed in claim 1, wherein a material of the protective cover plate comprises plastic or glass.

11. The front light module as claimed in claim 1, wherein the appearance color layer is directly formed on the third surface through ink printing.

12. An electrophoretic display device, comprising:

a front light module, comprising:

a light guide plate, having a first surface, a second surface opposite to the first surface, and a light incident surface connecting the first surface to the second surface;

a light source, disposed beside the light incident surface and configured to emit light toward the light incident surface;

a protective cover plate, disposed on the first surface and having a third surface facing away from the light guide plate and a fourth surface facing the light guide plate;

an appearance color layer, disposed on one portion of the third surface, wherein the appearance color layer comprises a plurality of stacked sub-ink layers and a transparent layer disposed between the stacked sub-ink layers; and a functional layer, covering the appearance color layer and the third surface; and an electrophoretic display panel, disposed below the front light module, wherein the light guide plate is located between the electrophoretic display panel and the protective cover plate.

13. The electrophoretic display device as claimed in claim 12, wherein the functional layer is an anti-glare layer, an anti-fingerprint layer, an anti-reflection layer, or a hard coating layer.

14. The electrophoretic display device as claimed in claim 12, wherein the appearance color layer is disposed on a peripheral region of the third surface.

15. The electrophoretic display device as claimed in claim 12, wherein the sub-ink layers comprise:

a non-black sub-ink layer; and a black sub-ink layer, disposed between the protective cover plate and the non-black sub-ink layer.

16. The electrophoretic display device as claimed in claim 15, wherein the transparent layer is disposed between the non-black sub-ink layer and the black sub-ink layer.

17. The electrophoretic display device as claimed in claim 16, wherein a refractive index of the transparent layer is greater than a refractive index of the protective cover plate and greater than a refractive index of the functional layer.

18. The electrophoretic display device as claimed in claim 16, wherein the transparent layer encapsulates a side surface of an inner edge of the black sub-ink layer.

19. The electrophoretic display device as claimed in claim 16, wherein the transparent layer covers the black sub-ink layer and the other portion of the third surface not covered by the appearance color layer.

20. The electrophoretic display device as claimed in claim 12, wherein the protective cover plate is a transparent substrate.

21. The electrophoretic display device as claimed in claim 12, wherein a material of the protective cover plate comprises plastic or glass.

22. The electrophoretic display device as claimed in claim 12, wherein the front light module further comprises a touch panel disposed between the light guide plate and the protective cover plate.

* * * * *